March 9, 1971  L. SCHWAB  3,568,412
FILTER ASSEMBLY
Filed June 6, 1968  2 Sheets-Sheet 1
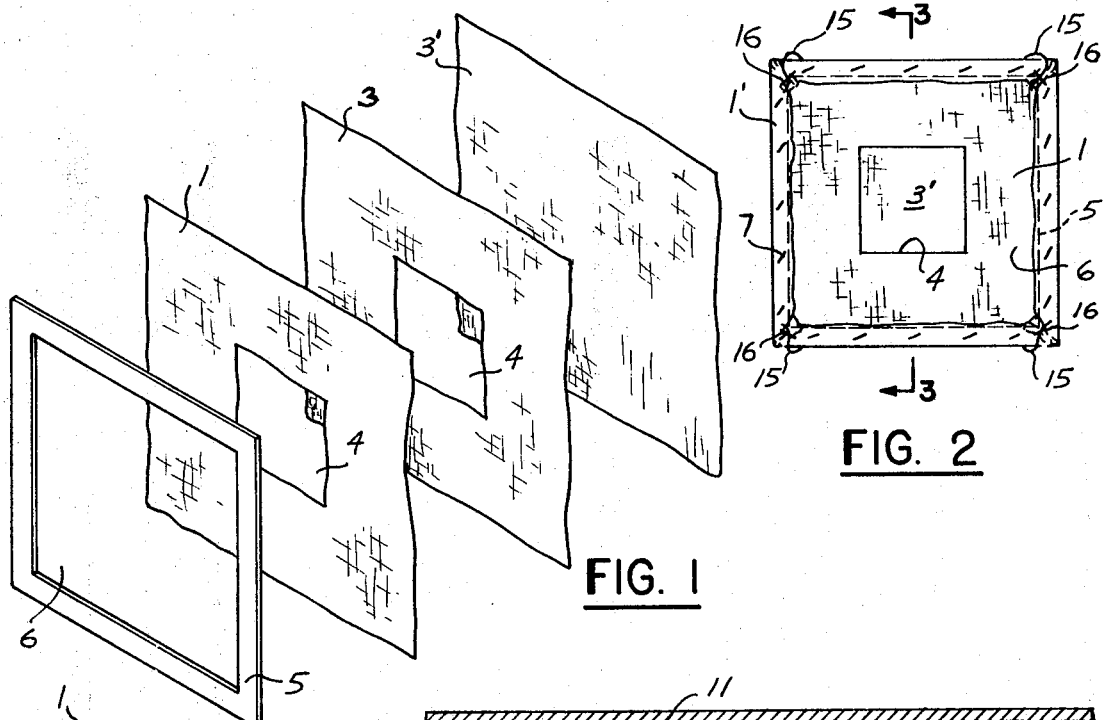
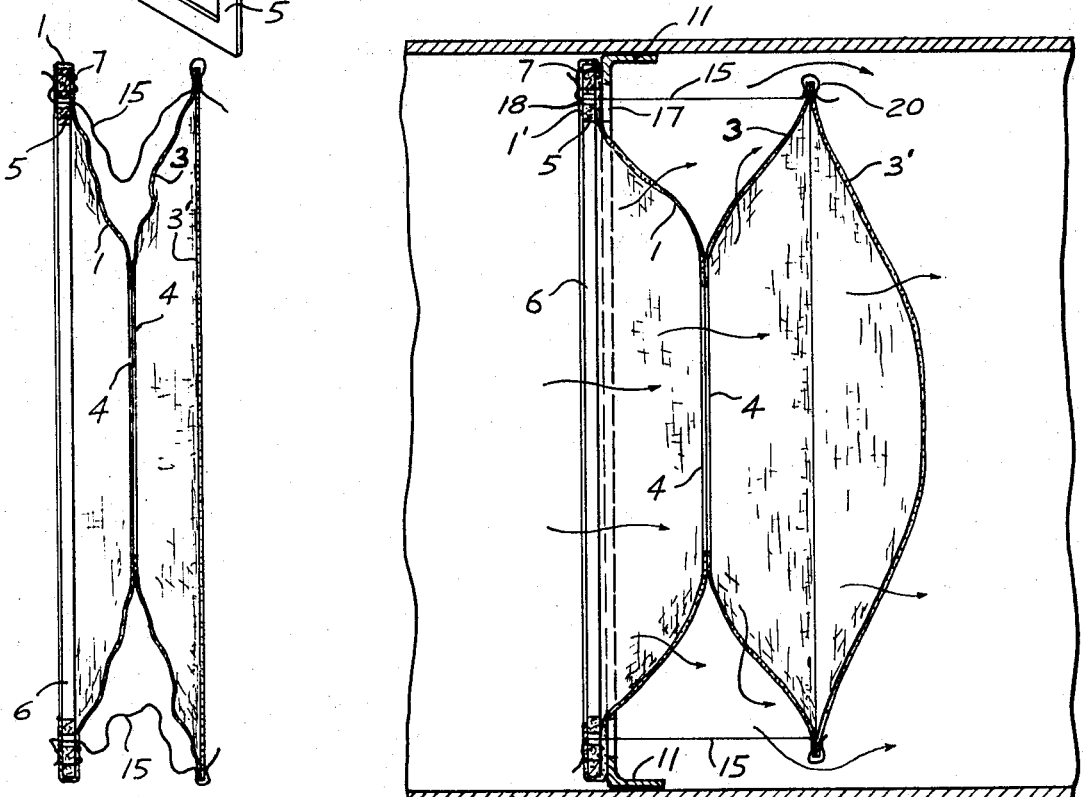
INVENTOR.
LOUIS SCHWAB
BY Hane and Baxley
ATTORNEYS March 9, 1971 L. SCHWAB 3,568,412
FILTER ASSEMBLY
Filed June 6, 1968 2 Sheets-Sheet 2
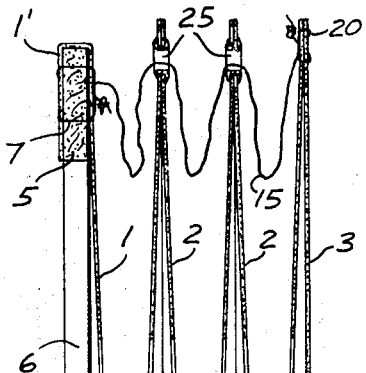
FIG. 5
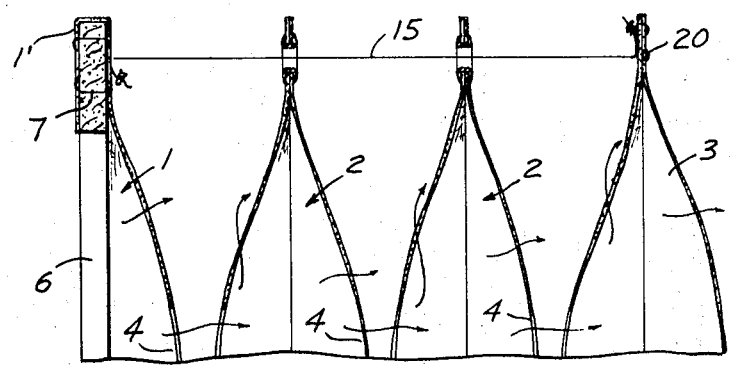
FIG. 6
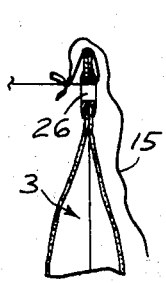
FIG. 7
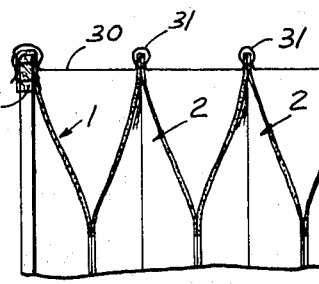
FIG. 8
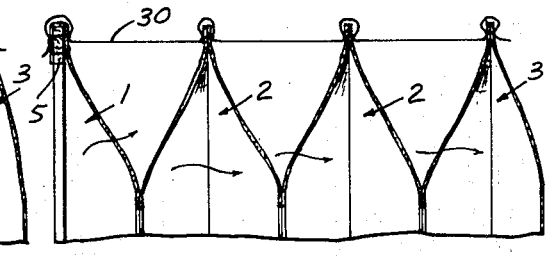
FIG. 9 FIG. 10
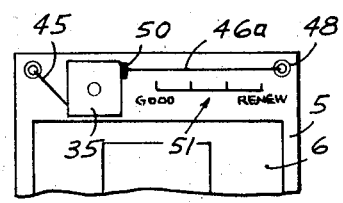
FIG. 12A
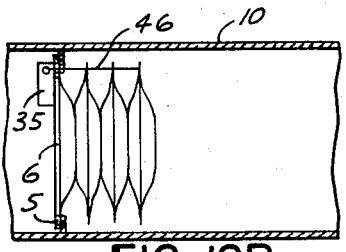
FIG. 12B
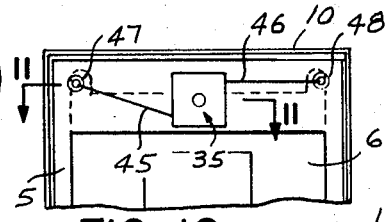
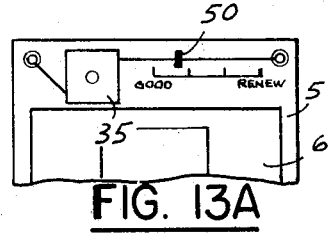
FIG. 13A
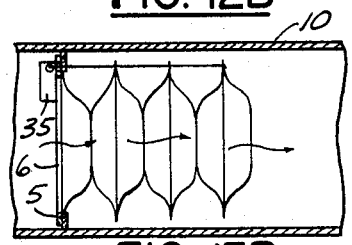
FIG. 13B
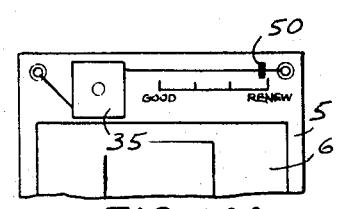
FIG. 14A
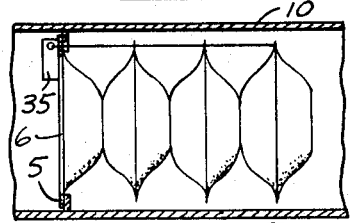
FIG. 14B
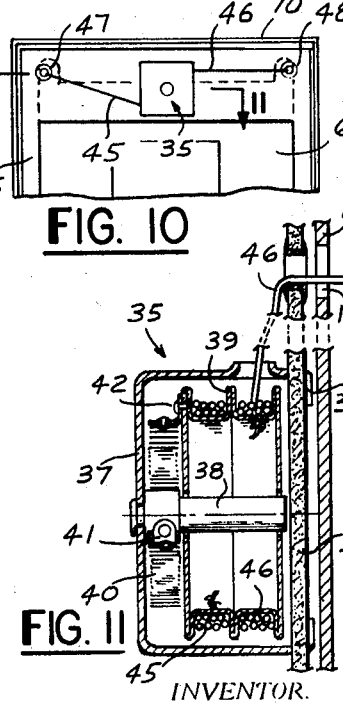
FIG. 11
INVENTOR.
LOUIS SCHWAB
BY Hame and Bayley
ATTORNEYS

# United States Patent Office 3,568,412
Patented Mar. 9, 1971

3,568,412
FILTER ASSEMBLY
Louis Schwab, P.O. Box 575,
Miami Beach, Fla. 33139
Filed June 6, 1968, Ser. No. 735,126
Int. Cl. B01d 35/14
U.S. Cl. 55—274                    6 Claims

ABSTRACT OF THE DISCLOSURE

A filter assembly for liberating an air or other gaseous flow from discrete solid particles such as dust, the filter material of which is in the form of a bellows including one or several joined folds, the bellows being open at the upstream end and closed at the downstream end either by filter material or by flow-impervious material. The folds assume a substantially contracted state when the filter assembly is inactive, that is, not exposed to impingement by an air flow and are substantially elongated in depth by the pressure of such air flow thereby greatly increasing the effective filter area. The folds return to the substantially contracted state upon cessation of the air flow, either by elasticity of the filter material or by mechanical force.

---

The present invention relates to a filter assembly, and more particularly to a filter assembly for liberating a gaseous flow such as an air flow from solid discrete particles such as dust.

It is a broad object of the invention to provide a novel and improved filter assembly of the general kind above referred to which in its inactive position, that is, when not exposed to an impinging gaseous flow is comparatively shallow, that is, in a substantially lengthwise contracted state and which when exposed to the impact of a gaseous flow automatically is elongated to a considerable depth and presents a very large filtering area in relation to the overall dimensions of the filter assembly.

A more specific object of the invention is to provide a novel and improved filter assembly of the general kind above referred to in which flow-permeable sheet material in the form of a bellows having one or several folds assumes a substantially contracted configuration when the filter assembly is inactive and is automatically elongated to an adjustably controllable depth when the upstream side of the filter assembly is exposed to a gaseous flow.

Another more specific object of the invention is to provide a novel and improved filter assembly of the general kind above referred to in which flow-permeable sheet material in the form of a bellows having one or several folds open at the upstream side and closed at the downstream side is held in a substantially contracted position by a yielding force in the absence of a gaseous flow and is inflated by the impact of said flow, said yielding force returning the fold or folds of the bellows into the substantially lengthwise contracted configuration thereof upon cessation of the gaseous flow, or at least decrease of the force thereof below a predetermined value.

A further more specific object of the invention is to provide a novel and improved filter assembly of the general kind above referred to in which the fold of the bellows at the upstream end thereof terminates in an outwardly tapered fold half secured at its rim to a preferably flat frame and the fold at the downstream end of the bellows in an inwardly tapered fold half closed by an end wall of filter material or by a layer of flow-impervious material.

It is also an object of the invention to provide a novel and improved filter assembly in which an indicating means indicates sagging of the bellows and the elongation thereof, sagging or elongation of the bellows being indicative of heavy clogging of the filter material. Indicating means of this type provide a convenient yardstick whether a filter assembly should be replaced by a fresh one.

Other and further objects, features and advantages of the invention will be pointed out hereinafter and set forth in the appended claims constituting part of the application.

In the accompanying drawing several embodiments of the invention are shown by way of illustration and not by way of limitation.

In the drawing:

FIG. 1 is a perspective exploded view of components of the filter assembly;

FIG. 2 is an elevational front view of the filter assembly;

FIG. 3 is a section taken on line 3—3 of FIG. 2 on an enlarged scale showing the filter assembly in the inactive or substantially contracted state;

FIG. 4 is a sectional view of the filter assembly of FIG. 3 showing the same in its elongated or distended state;

FIG. 5 is a sectional view similar to FIG. 3 showing a modification of the filter assembly in its inactive or substantially contracted state;

FIG. 6 is a sectional view of the filter assembly of FIG. 5 showing the same in its elongated or distended state;

FIG. 7 is a fragmentary sectional view of another modification of the filter assembly;

FIG. 8 is a fragmentary sectional view of still another modification of the filter assembly, showing the filter assembly in its partly elongated or inflated state;

FIG. 9 is a view of the filter assembly according to FIG. 8 showing the same fully elongated or distended;

FIG. 10 is a fragmentary front view, partly in section, of a filter assembly including retractor means for retracting the bellows of the filter assembly from it elongated state into its substantially contracted state;

FIG. 11 is a detailed view taken on line 11—11 of FIG. 10 of the retractor means of FIG. 10, on an enlarged scale;

FIG. 12A is a front view of a filter assembly including an indicating means for showing the degree of the loading of the filter material with dust, the filter assembly being inactive;

FIG. 12B is a sectional side view of the filter assembly of FIG. 12A;

FIG. 13A is a front view similar to FIG. 12A showing the filter assembly partly loaded with dust but still in efficient condition;

FIG. 13B is a sectional side view of FIG. 13A;

FIG. 14A is a front view similar to FIG. 13A but showing the indicating means in a position indicating exhaustion or full loading of the filter material; and FIG. 14B is a sectional side view of FIG. 14A.

The filter material as used in the exemplified filter assembly is a pliable, soft material, that is, a permeable, non-form retaining suitable material such as Dynel industrial cloth, nylon cloth or reinforced cotton fabric. If desired, the filter material can be flame-proofed by techniques suitable and known for the purpose. The density of the filter material is selected in accordance with the particular gaseous flow to the liberated from discrete solid particles and the acceptable pressure drop between the upstream side and the downstream side of the filter.

Referring first to FIGS. 1 to 4 more in detail, there are shown in FIG. 1 three filter components, 1, 3 and 3'. Each of these components is made of pliable filter material of the kind herein referred to. Component 1 is a downstream half of a fold of a bellows or an accordion and components 3 and 3' are an upstream half and a downstream half respectively of one complete fold of the bellows or accordion. All three components are shown in collapsed or lengthwise contracted condition. The components are shown as having a rectangular peripheral outline but other suitable peripheral outlines may also be used. As will appear from the subsequent description, component 1 is at the upstream end of the filter assembly and components 3 and 3' at the downstream end thereof. Fold parts 1 and 3 define rectangularly or otherwise suitably shaped passage openings 4 to permit a passage for the gaseous flow to be liberated from solid particles, but fold part 3' is closed off either by flow-permeable filter material, or by a pliable and at least substantially impervious material, as it has been found that the use of an impervious end wall has very little effect upon the pressure drop across the filter material.

The individual folds may be made of one piece of filter material, but preferably each fold is made of two complementary pieces which are joined along their outer and inner peripheral rims by gluing; stitching, stapling or any other suitable fastening means. Moreover, one of the two fold halves, preferably the upstream half, may be made of a filter material which has a higher flow-permeability than the filter material used for the downstream half.

There is further shown in FIG. 1 a substantially rigid, narrow frame 5 having a peripheral outline corresponding to the peripheral outline of the filter folds, a rectangular outline being shown in conformity with the outline of the folds. The frame defines a centric inflow opening 6.

While a flanged frame may be used, a flat frame as shown is generally preferable and also less expensive. The frame may be made of any suitable low-cost material of sufficient rigidity, such as heavy gauge or reinforced cardboard.

As is shown in FIG. 2, the rim 1' of the fold half 1 is suitably secured to and along the outer rim of frame 5, preferably by turning rim 1' over the outside edge of the frame and then securing the turned-over fold portions to the frame, for instance by stapling, as it is indicated at 7 or by other means such as stitching and gluing.

As shown, the outer peripheral outline of frame 5 is preferably somewhat smaller than the folds, to facilitate wrapping of the rim of fold half 1 about the edge of the frame without unduly stressing the fold material and also without causing heavy distortions of the folds when the filter assembly is in use, as will be explained hereinafter.

The assembled structure constitutes a bellows into which a gaseous flow can be directed through inflow opening 6 of the frame.

FIGS. 3 and 4 show the filter assembly in greater detail. The filter assembly of the figures utilizes the components of FIGS. 1 and 2.

As is shown in FIG. 4, the filter assembly is installed in a duct 10 by suitable means such as flanges or brackets 11 to which frame 5 is secured by suitable means.

FIG. 3 shows the filter assembly in its inactive state, that is, when the filter assembly is not subjected to a gaseous flow such as a dust-laden airflow. The bellows folds, due to their softness and a certain inherent though slight elasticity, will tend to occupy the substantially flattened or lengthwise contracted position shown in FIG. 3. It should be pointed out in this connection that the bellows configuration of FIG. 3 does not constitute a substantially fixed configuration but the configuration of the bellows formed by the folds will be a more or less random configuration depending upon the specific type of the used filter material and the extent to which the filter material is laden with trapped dust particles.

Let it now be assumed that a dust-laden airflow is directed upon and into the inflow opening 6. Such airflow will form a more or less pronounced vortex adjacent to and within the filter assembly, and the force of the airflow will cause an inflation or lengthwise elongation of the individual folds, as is shown in FIG. 4. The air will escape through the walls of the folds, as is indicated by arrows and the dust particles carried by the air will be trapped when the airflow passes through the filter walls. Due to the bellows configuration of the filter material, the media velocity can and should be considerably lower than conventional. Tests have shown that the media velocity can be about one-third less than the conventional 40 to 50 feet/minute.

As has been previously explained, the fold half 3' closing off the bellows may be air-permeable or impervious. It is indicated by the arrows to be permeable. If it is impervious or substantially impervious, the air will be deflected to the side walls of fold part 3, without appreciable increase of the pressure drop as previously stated.

As is apparent from FIG. 3, the filter assemby in its inactive condition occupies very little space; for the purpose of storage it can be completely collapsed. However, when the filter assembly is activated, it automatically expands so that a very substantial filter area becomes available. As is shown in the subsequent figures, the filter area can be readily increased to practically any desired area by using one or several intermediate bellows folds 2 without appreciably increasing the space occupied by the filter when collapsed, as described in connection with FIG. 3. Each of the intermediate folds comprises an upstream half similar to component 1 and a downstream half similar to component 3 joined along the outer and inner peripheral rims. The optimal ratio of the filter area as defined by the inner peripheral outline of frame 5 and the area of opening 4 of fold part 1 leading into the individual bellows folds can be easily determined in accordance with the standard equation:

$$velocity \times area = cubic\ feet/minute$$

The range for a suitable ratio between the inner outline of frame 5 and the respective opening 4 has been found to be between 3 to 1 and 5 to 1, and preferably 4 to 1.

The filter assembly as hereinbefore described is free to expand and elongate in accordance wtih the properties of the used filter material and the flow pressure to which the material is exposed. However, it has been found to be advantageous to limit the elongation of the bellows. To this end, restraining means are provided, shown as strings or ribbons 15. One end of each string is secured to frame 5, for instance by staples 16, which at the same time may penetrate the turned-over fold rim 1'. To facilitate securing of this end of the strings the same may be extended through slots 17 in brackets 11 and holes 18 in frame 5. The other end of each string is secured to the peripheral rim of terminal fold part 3', for instance, by stitching or stapling the string end to the fold rim, as it is indicated at 20. The same staples may also be used to secure the outer rims of two halves of folds to each other.

If one or several intermediate folds 2 are used, the inner ends of strings 15 may also be secured to the rim of one of the intermediate folds, but generally it is advantageous to secure the inner string end to the rim of the bellows fold at the downstream end of the bellows.

Restraining strings may be provided at all four edges of the bellows, but less than four strings may also be used, for instance strings at the two upper edges only or at two diagonal edges.

The restraining function of the strings is evident from a comparison of FIGS. 3 and 4. The strings are slack when the filter assembly is collapsed, but more or less stretched when it is elongated during operation.

FIGS. 5 and 6 show a filter assembly similar to that shown in FIGS. 3 and 4, except that two intermediate bellows folds 2 are interposed between the upstream fold half 1 and the downstream fold 3 and 3'. The restraining strings 15 are again secured on one end to frame 5 and on the other end to the downstream fold 3 and 3'. While it is of course possible and within the scope of the invention to secure the strings to the rims of the intermediate folds, it is advantageous and also shown to guide the strings through eyelets 25 in the rims of the intermediate folds so that these folds can adjust themselves when the assembly is in use, that is, when the folds are fully inflated, as is shown in FIG. 6.

FIG. 7 shows a modification applicable either to the assembly of FIGS. 3 and 4 or to the assembly of FIGS. 5 and 6 in that strings 15 are not fixedly secured at both ends to the respective component of the assembly but threaded through an eyelet 26 in downstream fold 3 and 3′, and held by a knot in position. This arrangement permits a convenient adjustment of the effective length of strings 15 and thus of the possible elongation of the bellows in use. A similar arrangement can of course also be provided at the frame end of the strings.

As previously described, adjustable restraining strings 15 can be provided at all four corners of the bellows or only at selected corners such as the upper corners.

FIGS. 8 and 9 show a filter assembly in partly and fully elongated position respectively, similar to FIGS. 5 and 6 except that the strings 15 of these figures are replaced by elastics 30 secured at their ends to frame 5 and downstream fold 3 and 3′ respectively, as previously described. The strings also are secured by stapling or stitching to the rims of intermediate bellows folds 2, as it is indicated at 31. As is evident, elongation of the bellows by the force of an impinging air flow stretches and thus tensions the elastics. Accordingly, the elastics will return the bellows from an elongated position of FIG. 9 into substantially contracted position when the filter assembly is not in use, or when the force of the air flow decreases below a value lower than the recovery force stored in elastics 30.

As explained before, the bellows is shown in FIG. 8 in a partly elongated state, but of course it can be pulled tighter together by suitably selecting the lengths of strings 30 in their relaxed condition.

FIGS. 10 and 11 show another modification of restraining means for positively returning the bellows into its substantially contracted state upon cessation of the air flow, or decrease thereof below a predetermined value. According to the figures, a retractor device 35 is suitably secured to the front face of frame 5, for instance by bent-over tongues 36.

The retractor device which is shown in detail in FIG. 11 comprises a box 37 in which a spindle 38 is fixedly secured. The spindle rotatably seats a stamped-out double sheave 39 which is restrained by a spiral spring 40 secured at its inner end 41 to spindle 38 and at its outer end 42 to the sheave. Strings 45 and 46 are wound about the two halves of the sheave, secured on one end thereto. The other ends of the strings are guided through eyelets 47 and 48 respectively, in frame 5, and secured on the other end to the downstream fold 3 and 3′ as has been described in connection either with FIGS. 3 and 4 or FIGS. 5 and 6.

As is evident, elongation of the bellows in use will pull out strings 45 and 46, thereby correspondingly winding spring 40. Upon deactivation of the filter assembly, the spring will unwind, thereby rewinding the strings upon the sheave and thus retracting the bellows. A similar detractor device can also be provided for restraining strings on the two lower edges of the bellows, or a single detractor device with four sheaves may be provided.

While in the preceding description reference has been made to a gaseous flow directed into the upstream side of the filter assembly, the same filtering effect and the same elongation of the bellows are obtained by providing a suction force on the downstream side of the bellows.

As is evident, the filter area of the filter assembly becomes gradually laden with trapped dust particles. As a result, the filtering efficiency decreases correspondingly until it is exhausted. There is no definite period of time after which the filter assemblies must be replaced, as obviously the useful life of the assembly varies with the prevailing ambient conditions which, in turn, are usually highly variable. Accordingly, filter assemblies, of which there may be many in an installation, must or should be inspected at least at regular intervals, which is time-consuming and hence costly.

Loading of the filter with dust obviously increases the weight of the filter and such increase results in sagging or other distortion of the filter assembly in its activated or elongated condition.

The invention encompasses an indicating or measuring means which responds to deformations of the bellows as caused by an increase in weight thereof and indicates whether the loading of a filter assembly with dust has reached a point where the filter must be replaced. An indicating means of this kind has the advantage that service personnel can supervise the filter assembly while the filter assembly is in operation and without having to rely upon guess work whether a specific filter assembly is still serviceable. The filter assemblies as now known require stoppage of the filtering operation and withdrawal of the filter assembly from the duct.

FIGS. 12A and 14B inclusive show a suitable indicating means.

The indicating means comprises a retractor device 35 as described in connection with FIGS. 10 and 11. One of the strings such as string 45 is arranged as described in connection with FIG. 10 and the other string 46 is guided across frame 5 along a straight line, as is indicated for strip portion 46a.

A marker or pointer 50 is secured to this string portion. The marker also serves as a stop to prevent excessive retraction of the bellows by the force of spring 40. The marker coacts with a scale 51 suitably calibrated, as is shown in FIG. 12A. This figure and FIG. 12B shows a bellows in its substantially contracted position in which marker 50 abuts against box 37 of the retractor.

FIGS. 13A and 13B show the filter normally expanded and hence the marker occupies a position within the acceptable range.

FIGS. 14A and 14B show a bellows the folds of which are over-extended and somewhat sagging due to heavy loading and clogging. Accordingly, the bellows is pulled out into a position in which marker 50 occupies the RENEW point, or is close thereto.

The concept of providing indicating means sensitive to deformation of the bellows due to overloading and clogging can, of course, be carried out in many different ways within the concept of this invention.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A filter assembly for liberating a gaseous flow from discrete solid particles entrained therein, said filter assembly comprising:

a multiple-fold bellows open at one end and closed at the other end, said open end of the bellows constituting the upstream side of the filter assembly and said closed end the downstream side thereof, each of the folds of said bellows being formed by two substantially rectangular sheets of air-pervious pliable filter medium, each of said sheets, except the one at the downstream end of the bellows having a substantially rectangular central opening, pairs of said sheets being joined along their peripheral edges and the facing sheets of adjacent pairs being joined along the peripheral edges of the openings therein;

a substantially rigid flat frame defining a rectangular inflow opening, the sheet at the open end of the bellows being secured along its outer peripheral edge to a flat side of said frame in registry with said inflow opening, impingement of a gaseous flow upon the upstream side of the filter assembly elongating the bellows from a substantially lengthwise contracted state to a lengthwise elongate state; and restraining means mounted on the outside of the bellows and connected between two portions of the bellows spaced in downstream direction, said restraining means including indicating means comprising a marker means indicating the extent of changes in the spacing of said portions due to loading of the flow-permeable material with liberated solid particles.

2. The filter assembly according to claim 1 wherein the flow permeability of the upstream facing sheet of at least one fold of the bellows is greater than the flow-permeability of the downstream sheet of the respective fold.

3. The filter assembly according to claim 1 and comprising elongate pliable restraining means extending along the outside of the bellows between two lengthwise spaced portions of the bellows secured to said portions to limit elongation of the bellows by impingement of the gaseous flow upon the upstream end thereof, said restraining means including at least one elastically stretchable string, said string being stretched upon elongation of the bellows and returning the bellows to its substantially contracted state upon decrease of the gaseous flow below a force balancing the pull-back force of the stretched string.

4. The filter assembly according to claim 1 wherein said indicating means comprises a spring motor secured to the frame, and an elongate pliable member coupled on one end to said motor for unwinding and winding of said member by winding and unwinding, respectively, of the motor spring and on the other end secured to a downstream portion of the bellows, elongation of the bellows causing a corresponding unwinding of said member and winding of the spring, the extent of the unwinding of the member being indicative of the changes in the configuration of the bellows.

5. The filter assembly according to claim 4 wherein said spring motor is secured to the outwardly facing side of said frame, guide means guiding a portion of said elongate pliable member along the outwardly facing side of the frame, said marker means being secured to said guide member portion for movement in unison with the same, the position of said marker means in reference to said frame side being indicative of the changes in the configuration of the bellows.

6. A filter assembly for liberating a gaseous flow from discrete solid particles entrained therein, said filter assembly comprising:

a multiple-fold bellows open at one end and closed at the other end, said open end of the bellows constituting the upstream side of the filter assembly and said closed end the downstream side thereof, each of the folds of said bellows being formed by two substantially rectangular sheets of air-pervious pliable filter medium, each of said sheets, except the one at the downstream end of the bellows having a substantially rectangular central opening, pairs of said sheets being joined along their peripheral edges and the facing sheets of adjacent pairs being joined along the peripheral edges of the openings therein;

a substantially rigid flat frame defining a rectangular inflow opening, the sheet at the open end of the bellows being secured along its outer peripheral edge to a flat side of said frame in registry with said inflow opening, impingement of a gaseous flow upon the upstream side of the filter assembly elongating the bellows from a substantially lengthwise contracted state to a lengthwise elongate state; and restraining means including a spring motor stationarily mounted at the upstream end of the bellows and a string extending from said spring motor to a downstream portion of the bellows secured thereto, elongation of the bellows by impingement of the gaseous flow upon the downstream thereof winding the spring of said motor whereby the bellows is returned to its substantially contracted state by unwinding of the spring upon decrease of the force of the impinging gaseous flow below a predetermined value.

References Cited

UNITED STATES PATENTS

| | | | |
|---|---|---|---|
| 2,543,556 | 2/1951 | Senné | 55—376X |
| 3,099,546 | 7/1963 | Smallpiece | 55—274 |
| 3,204,392 | 9/1965 | Schwab | 55—381 |
| 720,084 | 2/1903 | Thurman | 55—381 |
| 2,076,304 | 4/1937 | Strindberg | 55—381(X) |
| 3,396,517 | 8/1968 | Schwab | 55—381(X) |

DENNIS E. TALBERT, Jr., Primary Examiner

B. NOZICK, Assistant Examiner

U.S. Cl. X.R.

55—376, 378, 382, 521; 73—388; 91—1; 170—2; 229—53